M. S. CURTISS.
Singletree Hook and Clip.
No. 162,629.           Patented April 27, 1875.
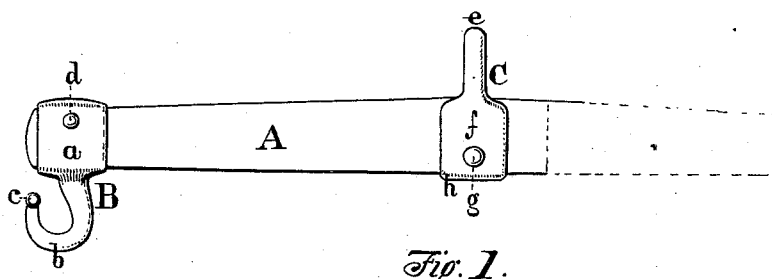
Fig. 1.
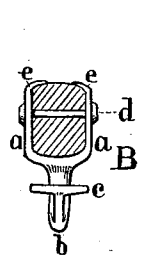 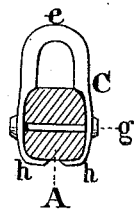 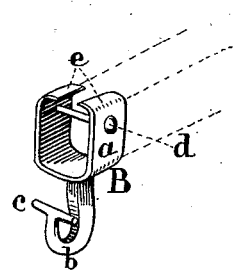
Fig. 2.     Fig. 3.     Fig. 4.
Witnesses
Clarence Thurlow
John Anders.
Marshall S. Curtiss,
by E. Thurlow,
his Atty. in fact
THE GRAPHIC CO. PHOTO-LITH. 39 & 41 PARK PLACE, N.Y.

UNITED STATES PATENT OFFICE.

MARSHALL S. CURTIS, OF EARLVILLE, ILLINOIS, ASSIGNOR OF ONE-HALF HIS RIGHT TO WILLIAM WILSON, OF SAME PLACE.

IMPROVEMENT IN SINGLE-TREE HOOKS AND CLIPS.

Specification forming part of Letters Patent No. 162,629, dated April 27, 1875; application filed February 3, 1875.

*To all whom it may concern:*

Be it known that I, MARSHALL S. CURTISS, of Earlville, in the county of La Salle and in the State of Illinois, have invented an Improvement in Single-Trees, or Single-Tree Hooks and Clips; and do hereby declare that the following is a full, clear, and exact description thereof, reference being had to the annexed drawings, making a part of this specification, in which like letters of reference refer to like parts, and in which—

Figure 1 represents a plan or superficial view of single-tree and hook and clip; Fig. 2, an end view of the hook; Fig. 3, an end view of the clip; Fig. 4, a perspective view of the hook.

The object of this invention is to furnish a hook and clip for single-trees, which shall be free from the danger of becoming loose or displaced by the shrinking of the wood, and at the same time to be so constructed in quantities and be held in store to be applied or fitted to a single-tree of any size, by bending the end of the side pieces which clasp the wood down to the surface of the latter, and be further secured through the said clasps and wood by a bolt or rivets; also, to provide the end of the hook with a cross-piece placed on, and at a right angle to, the point, to prevent the escape of the snap-hook or trace-ring, or other trace-connection.

In the drawings, A represents the single-tree; B, the hook, having the stem or clasp $a\ a$ in two separated divisions, which respectively clasp either side of the wood-work, and are each bent so as to lap over the rear corners of the same (see Fig. 2.) A bolt or rivet, $d$, passes through holes in the divisions and the wood-work, vertically, and further secures the hook. The hook proper $b$ is of the ordinary form, but the point is terminated by a short cross-piece, $c$, set at a right angle to the plane of the hook, so as to be vertical when the hook and single-tree are in ordinary working position, and is intended to prevent the escape of the trace-hook in whatever position the trace may be accidentally placed in.

The clip C or central eye, connecting the single-tree with the double-tree, is of the ordinary form as to its eye $e$, but its stem $f\ f$, or parts which clasp the wood, is made exactly similar to the corresponding part of the hook B, with the same lapping ends $h\ h$, and fastened by a similar bolt, $g$.

The advantages of this single-tree are, first, that the hook will not let the trace-hook escape under almost any conditions. Second, that the connection with the wood-work of both the hook and the clip is lasting and secure, with no possible chance of becoming loose by the continual jar and oscillation of the trace-hook and traces. This oscillation acts upon the ordinary form of hook or clip in such a manner as to ultimately loosen them, besides the liability of the same to become loose by the ordinary shrinkage of the wood, and let them slide off or get displaced.

What I claim as my invention is—

The combination of single-tree A with a hook having cross-piece $c$, returned clasps $a\ a$, and bolt $d$, and with a clip having similar clasps $f\ f$, and bolt $g$, substantially as and for the purposes set forth.

In testimony that I claim the foregoing improvement in single-trees or single-tree hook and clip, I have hereunto set my hand this 26th day of January, A. D. 1875.

MARSHALL S. CURTISS.

Witnesses:
CLARENCE THURLOW,
JOHN ANDERS.